(12) United States Patent
Kondo

(10) Patent No.: US 9,505,362 B2
(45) Date of Patent: Nov. 29, 2016

(54) SHOCK-ABSORBING MEMBER

(75) Inventor: Osamu Kondo, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 60 days.

(21) Appl. No.: 14/004,610

(22) PCT Filed: Mar. 26, 2012

(86) PCT No.: PCT/JP2012/058775
§ 371 (c)(1),
(2), (4) Date: Oct. 15, 2013

(87) PCT Pub. No.: WO2012/133868
PCT Pub. Date: Oct. 4, 2012

(65) Prior Publication Data
US 2014/0034435 A1 Feb. 6, 2014

(30) Foreign Application Priority Data
Mar. 28, 2011 (JP) .................................. 2011-069261

(51) Int. Cl.
*B60R 19/34* (2006.01)
*F16F 7/12* (2006.01)
*B60R 19/26* (2006.01)

(52) U.S. Cl.
CPC ................. *B60R 19/34* (2013.01); *F16F 7/12* (2013.01); *B60R 2019/262* (2013.01)

(58) Field of Classification Search
CPC .......... B60R 19/34; B60R 19/26; F16F 7/12; F16F 7/123; F16F 7/03; F16F 7/125
See application file for complete search history.

(56) References Cited

U.S. PATENT DOCUMENTS

| 3,146,014 | A | * | 8/1964 | Kroell .......................... 293/133 |
| 3,216,593 | A | * | 11/1965 | Reuter et al. .................... 213/45 |
| 4,901,486 | A | * | 2/1990 | Kobori et al. ............... 52/167.2 |
| 5,293,973 | A | * | 3/1994 | Thum .......................... 188/377 |

(Continued)

FOREIGN PATENT DOCUMENTS

| DE | 4127381 A1 * | 9/1992 | ............. B60R 19/50 |
| DE | 19711647 A1 * | 10/1998 | ................. F16F 7/12 |

(Continued)

OTHER PUBLICATIONS

International Search Report, PCT/JP2012/058775, Jun. 26, 2012.
Extented European Search Report—EP 12 76 4031—Jul. 24, 2014.

*Primary Examiner* — Bradley King
*Assistant Examiner* — Stephen Bowes
(74) *Attorney, Agent, or Firm* — Young & Thompson

(57) ABSTRACT

Provided is a shock-absorbing member that does not increase the cost of automobile and that can increase the absorbed energy per unit weight of the shock-absorbing member. A shock-absorbing member 1 includes a tubular main body portion 3, a bent portion 5 that is formed continuous with the main body portion 3, and a flange 7 provided at the proximal end of the main body portion 3 via the bent portion 5. The main body portion 3 is caused to undergo eversion deformation by a shock power acting on the distal end of the main body portion 3 so that shock energy is absorbed. The main body portion 3 has regular polygonal cross-section orthogonal to the axial direction, and has a tapered shape that an area of the cross-section orthogonal to the axial direction decreases toward the distal end.

3 Claims, 5 Drawing Sheets

(56) References Cited

U.S. PATENT DOCUMENTS

| | | | |
|---|---|---|---|
| 6,588,830 B1 * | 7/2003 | Schmidt et al. | 296/187.09 |
| 7,201,413 B2 | 4/2007 | Hillekes et al. | |
| 7,905,366 B2 | 3/2011 | Jaede | |
| 2004/0113443 A1 * | 6/2004 | Glasgow et al. | 293/132 |
| 2006/0237976 A1 | 10/2006 | Glasgow et al. | |
| 2007/0147956 A1 * | 6/2007 | Spingler | F16F 7/125 404/6 |
| 2007/0187961 A1 * | 8/2007 | Audi et al. | 293/134 |
| 2008/0098601 A1 * | 5/2008 | Heinz et al. | 29/897.2 |
| 2013/0300138 A1 * | 11/2013 | Banasiak et al. | 293/133 |

FOREIGN PATENT DOCUMENTS

| | | |
|---|---|---|
| DE | 10 2005 021 663 | 5/2006 |
| EP | 1625978 | 2/2006 |
| EP | 1914144 | 4/2008 |
| EP | 2298610 A1 * | 3/2011 |
| JP | 2000-053017 | 2/2000 |
| JP | 2010-083455 | 4/2010 |
| JP | 2011-021644 | 2/2011 |
| WO | 2006-113608 | 10/2006 |

* cited by examiner (a) (b) (c)

(a) (b) (c)

SHOCK-ABSORBING MEMBER

TECHNICAL FIELD

This invention relates to a shock-absorbing member that can efficiently absorb the energy due to an automotive crash.

BACKGROUND ART

In order to reduce the shock of a frontal crash of an automobile, shock-absorbing members are attached to an automotive front bumper. Shock-absorbing members absorb the energy due to a crash. A hollow box body (so-called crash box) is deformed by the shock of a crash and thereby absorbs the energy.

Today, various shock-absorbing members are in practical use, an example of which is disclosed in Patent Literature 1.

The shock-absorbing member disclosed in Patent Literature 1 is "a shock-absorbing member including: a first portion that is a tubular body having an outer wall made of a metal sheet; a second portion that is a bent portion formed to be continuous with the outer wall of the first portion and to be bent outwardly; and a third portion that is continuous with the second portion and forms a support portion for the second portion, wherein bending deformation continuously occurs in which a length of a folded-back portion formed by folding back of the outer wall of the first portion caused by a shock power applied from the end of the first portion in the axial direction of the tubular body increases so that a shock energy is absorbed, and wherein the first portion has a plurality of ridge lines that extend in the axial direction of at least a part of the outer wall of the tubular body where the bending deformation continuously occurs" (see claim 1 of Patent Literature 1).

"The first portion and the third portion are both extend in a direction substantially parallel to the axial direction of the tubular body" (see claim 10 of Patent Literature 1).

CITATION LIST

Patent Literature

Patent Literature 1: Japanese Unexamined Patent Application Publication No. 2002-356179

SUMMARY OF INVENTION

Technical Problem

The inventor carried out a study on the energy absorption performance of "a shock-absorbing member wherein bending deformation continuously occurs in which the length of a folded-back portion formed by folding back of the outer wall of the first portion increases so that shock energy is absorbed" described in Patent Literature 1.

While the form of deformation of the shock-absorbing member is described as "the outer wall is folded back" in the related art, it is described as "the main body portion undergoes eversion deformation" in the description of this invention. Although they differ in wording, they are the same in meaning.

As an object of study, a shock-absorbing member having an octagonal cross-section was compared with a shock-absorbing member having a circular cross-section.

In a stationary deformation state in which the stroke is 50 mm or more, the counterforce was constant in the shock-absorbing member having a circular cross-section, whereas the counterforce increased gradually in the shock-absorbing member having an octagonal cross-section. The reason is that, in the shock-absorbing member having an octagonal cross-section, the curvature of folding-back deformation of the wall decreases with increase in stroke, and therefore the energy of deformation increases.

The amount of energy absorption increases with increase in counterforce. However, the automotive body to which the shock-absorbing member is attached is required to have strength to resist the counterforce. Therefore, the stiffness of the automotive body needs to be increased, and the cost increases.

Conversely, the fact that the counterforce increases in the middle of the stroke means that the counterforce is small in the first half of the stroke, and the absorbed energy per unit weight of the shock-absorbing member is small.

When the shock power acts along the axial direction of the shock-absorbing member, the above-described deformation occurs. However, when the shock power does not act along the axial direction, the shock-absorbing member comes into contact with a member to which the shock-absorbing member is attached during deformation, and the whole shock-absorbing member is broken (crashed).

This invention is made to solve such problems, and it is an object of this invention to obtain a shock-absorbing member that does not increase the cost of the automobile, that can increase the absorbed energy per unit weight of the shock-absorbing member, that can prevent crash of the whole shock-absorbing member, and that can undergo stable deformation.

Solution to Problem

The inventor carried out a study to hold the counterforce constant, that is, to hold deformed energy constant throughout the stroke in order to increase the absorbed energy per unit weight of the shock-absorbing member and to prevent the increase in the cost of automobile.

As a result, the inventor found that it is difficult to hold deformed energy constant by controlling the change in curvature of folding-back deformation. Therefore, the inventor hit on the idea to hold deformed energy constant by causing the volume of the part undergoing deformation to decrease with increase in deformation. Specifically, the inventor hit on the idea of forming a shock-absorbing member in a tapered shape that an area of cross-section orthogonal to the axial direction decreases toward the distal end of the shock-absorbing member.

This invention is based on the above-described finding, and specifically, it has the following configuration.

(1) According to this invention, a shock-absorbing member includes a tubular main body portion, a bent portion that is formed continuous with the main body portion, and a flange provided at the proximal end of the main body portion via the bent portion. The main body portion is caused to undergo eversion deformation by a shock power acting on the distal end of the main body portion so that shock energy is absorbed. The main body portion has a regular polygonal cross-section orthogonal to an axial direction, and has a tapered shape that an area of the cross-section orthogonal to the axial direction decreases toward the distal end.

(2) In the shock-absorbing member according to (1), the main body portion has a regular octagonal cross-section orthogonal to the axial direction.

(3) In the shock-absorbing member according to (1) or (2), the main body portion has linear grooves extending in the axial direction provided in side walls of the main body portion at regular intervals.

Advantageous Effects of Invention

In this invention, the main body portion of the shock-absorbing member has regular polygonal cross-section orthogonal to the axial direction, and has a tapered shape that an area of the cross-section orthogonal to the axial direction decreases toward the distal end. Therefore, the absorbed energy per unit weight of the shock-absorbing member can be increased without increasing the cost of automobile.

DESCRIPTION OF EMBODIMENTS

Embodiment 1

The shock-absorbing member 1 according to Embodiment 1 is a shock-absorbing member 1 including a tubular main body portion 3, and a flange 7 provided at the proximal end of the main body portion 3 with a bent portion 5 therebetween that is formed to be continuous with the main body portion 3, wherein the main body portion 3 is caused to undergo eversion deformation by a shock power acting on the distal end of the main body portion 3 so that shock energy is absorbed. The main body portion 3 has regular octagonal cross-section orthogonal to the axial direction, and has a tapered shape that an area of the cross-section orthogonal to the axial direction decreases toward the distal end.

The shock-absorbing member 1 is formed of a metal sheet. Each portion will be described in detail below.

Main Body Portion

The main body portion 3 is a tubular body having a regular octagonal cross-section orthogonal to the axial direction. It is formed of a metal sheet, and the main body portion 3 is tapered such that an area of the cross-section orthogonal to the axial direction decreases toward the distal end. The taper angle $\alpha$ is appropriately set so that the counterforce is held constant.

Bent Portion

The bent portion 5 is provided at the proximal end of the main body portion 3, and has a downwardly protruding U-shape. The bent portion 5 triggers the initial eversion deformation when the shock power acts on the shock-absorbing member 1. It is confirmed that, if the bent portion 5 is not provided, buckling occurs at the proximal end of the main body during the initial stage in which the counterforce acts. As a result, the counterforce decreases.

Flange

Figure 2:
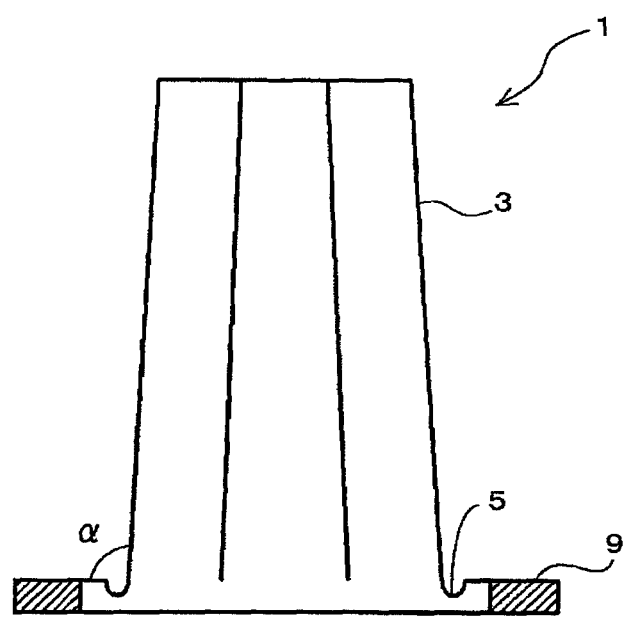
FIG. 2 is a sectional view of a shock-absorbing member according to an embodiment of this invention.

The flange 7 is provided like a ring on the outer periphery of the bent portion 5, and serves as an attachment portion for attaching the shock-absorbing member 1 to a bracket 9 of an automobile. In order for the shock-absorbing member 1 to undergo eversion deformation, the bracket 9 needs to have an opening having an area greater than the area of a portion of the shock-absorbing member 1 provided with the bent portion 5, as shown in FIG. 2.

The operation when the shock power acts on the shock-absorbing member 1 of this embodiment configured as described above will be described with reference to FIG. 3 and FIG. 4.

Figure 3:
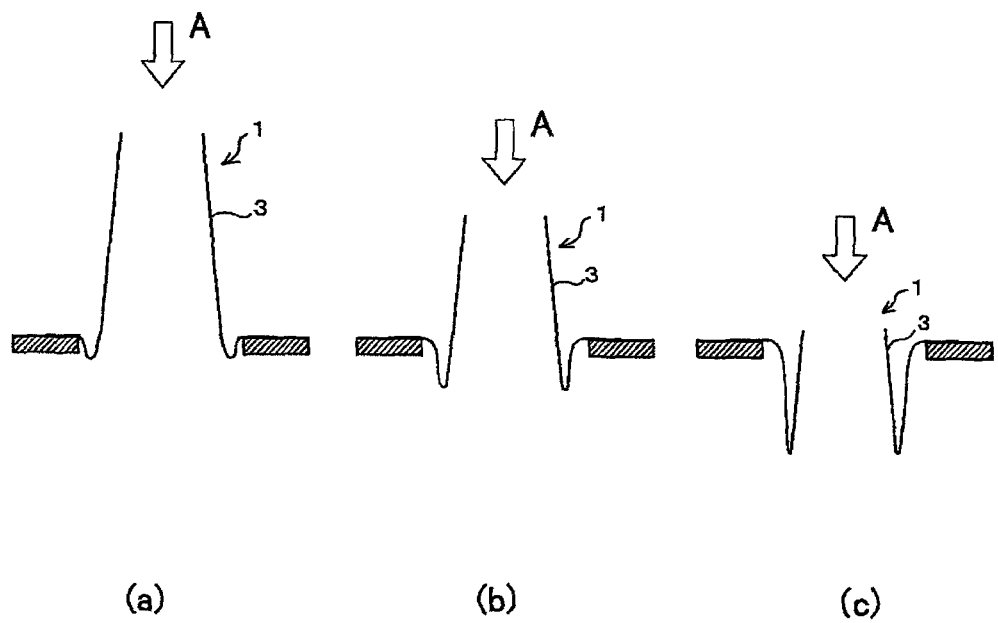
FIG. 3 is an explanatory view of the operation of a shock-absorbing member according to an embodiment of this invention.
Figure 4:
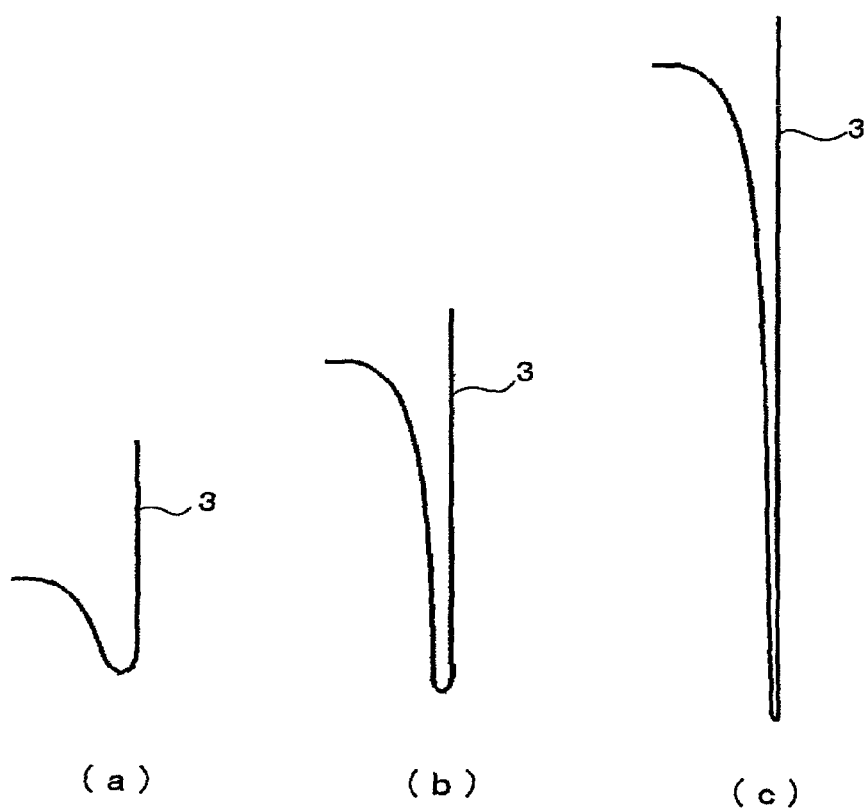
FIG. 4 shows an enlarged view of a portion of FIG. 3.

FIG. 3 shows how the main body portion 3 undergoes eversion deformation when the shock power shown by arrow A acts on the upper end of the shock-absorbing member 1 in an order of increasing the deformation in FIG. 3(a) to FIG. 3(c). FIG. 4 shows an enlarged view of the deformed portion shown in FIG. 3.

As shown in FIG. 3, when the shock power acts on the upper end of the shock-absorbing member 1, the main body portion 3 starts to undergo eversion deformation from the bent portion 5. At this time, as shown in FIG. 4, the curvature of deformation decreases with increase in deformation. As described above, the counterforce increases with decrease in the curvature of deformation.

However, the shock-absorbing member 1 of this embodiment has a tapered shape that an area of the cross-section orthogonal to the axial direction decreases toward the upper end. Therefore, the deformation volume decreases toward the upper end. That is, the increase in counterforce due to the decrease in the curvature of deformation is compensated for with the decrease in deformation volume so that the counterforce is held substantially constant.

Owing to the tapered shape, when the counterforce acts along a direction inclined from the axial direction, the shock-absorbing member 1 does not come into contact with the bracket 9 during the deformation of the shock-absorbing member 1 because there is a space between it and the bracket 9. Accordingly, a bend, or a crash, of the whole shock-absorbing member 1 can be prevented.

As described above, the counterforce is held constant despite the increase in deformation. Therefore, the absorbed energy per unit weight of the shock-absorbing member 1 can be increased without increasing the cost of automobile.

Figure 5:
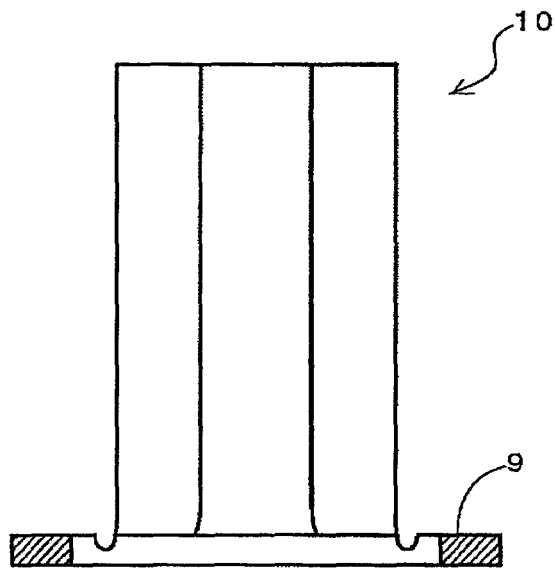
FIG. 5 is a sectional view of a comparative example used for illustrating the effect of a shock-absorbing member according to an embodiment of this invention.

An experiment for confirming the above-described effect was conducted. A description thereof will be given below. As a comparative example, a shock-absorbing member 10 shown in FIG. 5 that had a tubular main body portion having an octagonal cross-section orthogonal to the axial direction was used. The comparative example differs from this embodiment in that, whereas this embodiment has a tapered shape, the comparative example has an area of the cross-section orthogonal to the axial direction constant from the proximal end to the upper end.

Figure 6:
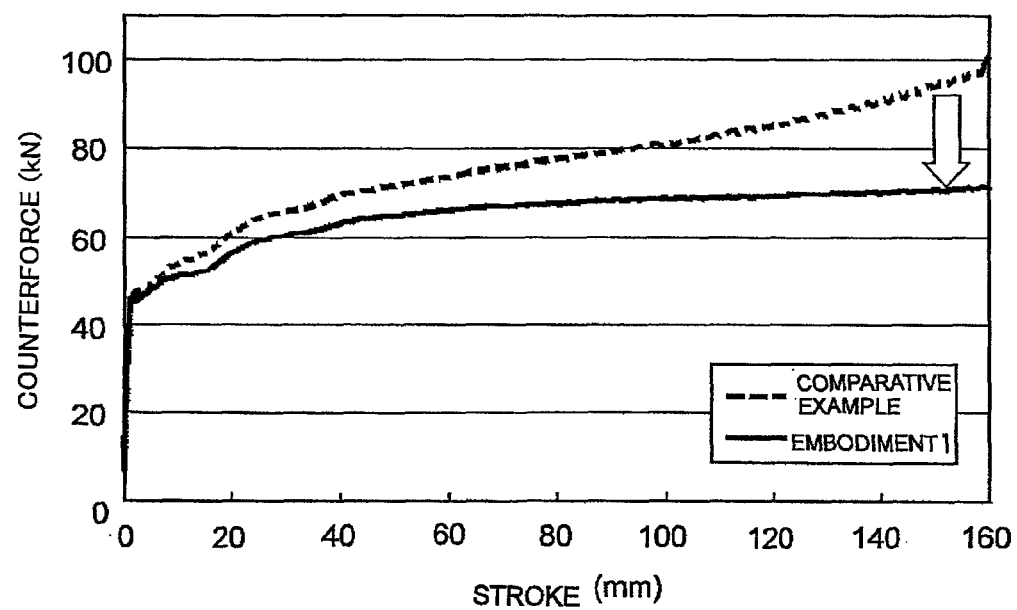
FIG. 6 is a graph illustrating the effect of a shock-absorbing member according to an embodiment of this invention.

The result of the experiment is shown in FIG. 6. In FIG. 6, the vertical axis shows counterforce (kN), and the horizontal axis shows stroke (mm).

As shown in FIG. 6, the counterforce is almost constant when the stroke is 60 mm or more in this embodiment, whereas the counterforce increases gradually even after the stroke exceeds 60 mm in the comparative example. As a result, the maximum counterforce of the comparative example is about 30 (kN) greater than that of this embodiment.

Therefore, when the shock-absorbing member 10 of the comparative example is installed in an automotive body, the automotive body needs to have a stiffness to resist the maximum counterforce, and the cost is increased correspondingly. In other words, if the maximum counterforce of the comparative example is the same as that of this embodiment, the energy the comparative example can absorb is smaller than the energy this embodiment can absorb. Conversely, if the maximum counterforce of this embodiment is the same as that of the comparative example, the energy that this embodiment can absorb is greater compared to that of the comparative example.

As described above, this embodiment does not increase the cost of automobile, and has excellent energy absorption performance.

The energy due to an automotive crash does not always acts perpendicular to the horizontal portion of the flange. If the energy due to a crash acts from an oblique direction, the side wall of the main body portion 3 of the shock-absorbing member 1 may come into contact with the edge of the opening of the bracket 9. However, since the side wall of the main body portion 3 of the shock-absorbing member 1 of this embodiment has a tapered shape, the side wall of the main body portion 3 is less likely to come into contact with the edge of the bracket 9.

Embodiment 2

Figure 1:
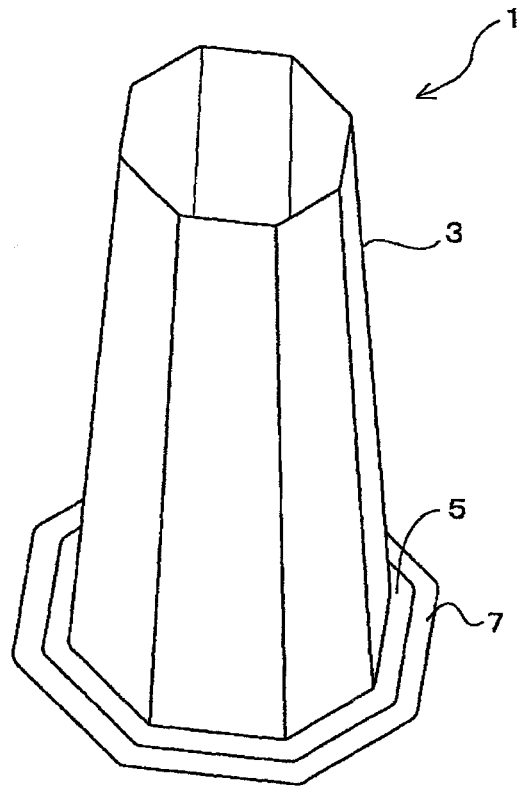
FIG. 1 is a perspective view of a shock-absorbing member according to an embodiment of this invention.
Figure 7:
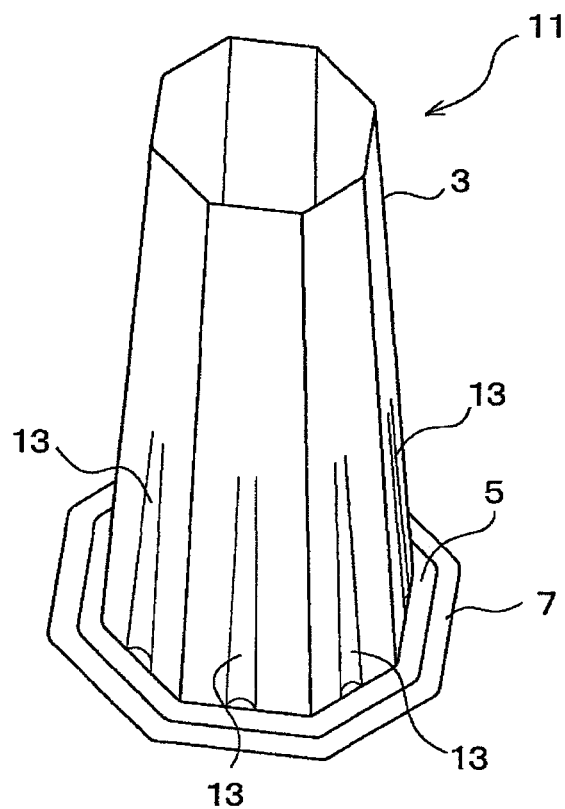
FIG. 7 is a perspective view of a shock-absorbing member according to another embodiment of this invention.
Figure 8:
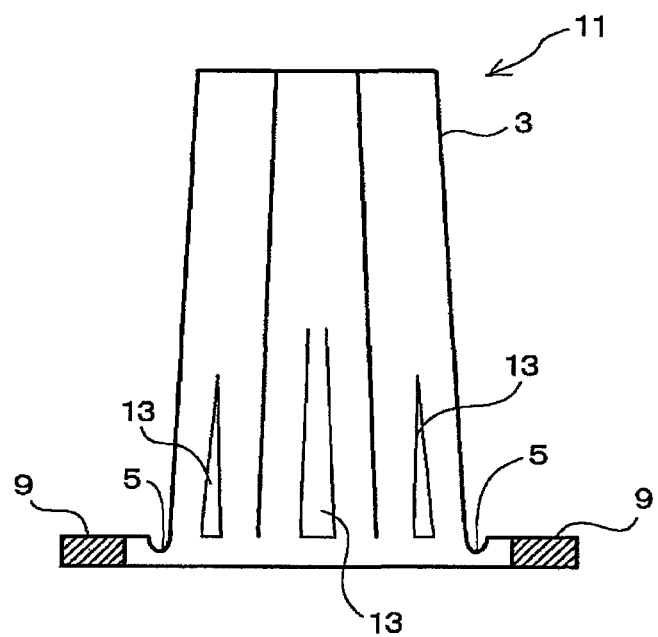
FIG. 8 is a sectional view of a shock-absorbing member according to another embodiment of this invention.

This embodiment will be described with reference to FIG. 7 to FIG. 9. In FIG. 7 and FIG. 8, the same reference numerals are used to designate the same members as those in FIGS. 1 and 2 showing Embodiments 1 and 2.

A shock-absorbing member 11 of this embodiment is the shock-absorbing member 1 of Embodiment 1 that is further provided with linear grooves 13 extending linearly from the proximal end toward the upper end at regular intervals in each side of the main body portion 3. The depth of the linear grooves 13 is set to decrease toward the upper end.

In order to confirm the effect of this embodiment, the same experiment as in Embodiment 1 was conducted, and a comparison was made with the shock-absorbing member 1 of Embodiment 1.

Figure 9:
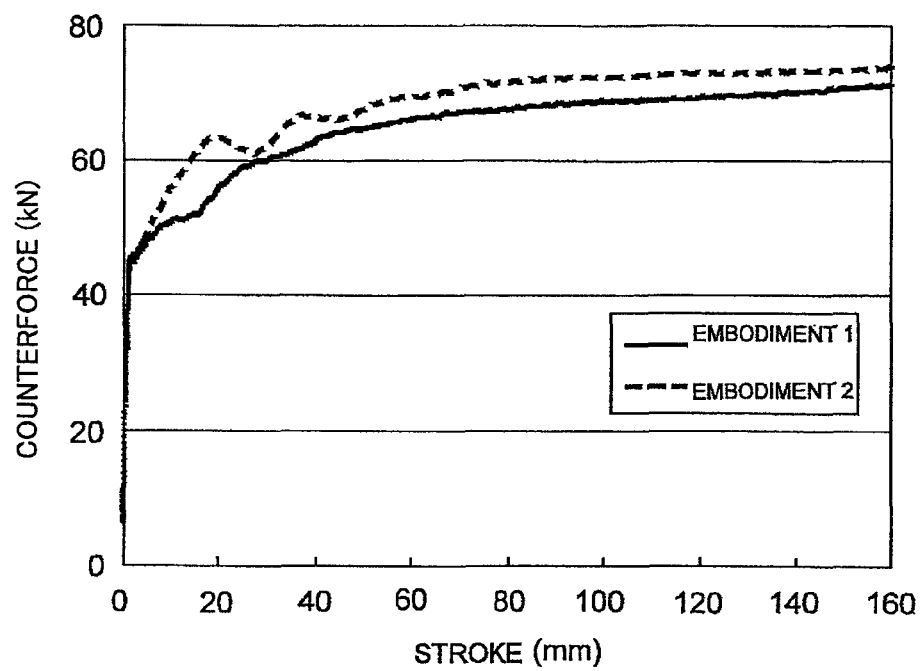
FIG. 9 is a graph illustrating the effect of a shock-absorbing member according to another embodiment of this invention.

The result of the experiment is shown in FIG. 9. In FIG. 9, as in FIG. 6, the vertical axis shows counterforce (kN), and the horizontal axis shows stroke (mm).

FIG. 9 shows that the counterforce of this embodiment is greater than that of Embodiment 1 in the early stage in which the stroke is 40 mm or less. When the stroke exceeds 60 mm, the counterforce is almost constant as with Embodiment 1.

As described above, according to this embodiment, the counterforce in the early stage of deformation can be made greater than that of Embodiment 1. As a result, the amount of shock energy absorption can be increased.

As described above, this embodiment has excellent energy absorption performance without increasing the cost of automobile, as with Embodiment 1. Further, the amount of energy absorption is greater than that of Embodiment 1.

In the above-described embodiments, the cross-section orthogonal to the axial direction of the main body portion 3 is octagonal in shape. However, this invention is not limited to this. Examples of the shape include a quadrilateral, a pentagon, a hexagon, a heptagon, and polygons having eight or more sides.

REFERENCE SIGNS LIST 1 shock-absorbing member (Embodiment 1)
3 main body portion
5 bent portion
7 flange
9 bracket
10 shock-absorbing member (comparative example)
11 shock-absorbing member (Embodiment 2)
13 linear groove

The invention claimed is:
1. A shock-absorbing member comprising:
a tubular main body portion having an outer surface, an inner surface opposite the outer surface, and a hollow interior cavity defined by the inner surface;
a bent portion that is formed continuous with the main body portion; and
a flange provided at a proximal end of the main body portion via the bent portion,
wherein the main body portion is configured to undergo eversion deformation by a shock power acting on a distal end of the main body portion so that a shock energy is absorbed,
wherein the main body portion has a regular polygonal cross-section orthogonal to an axial direction, and has a tapered shape that an area of the cross-section orthogonal to the axial direction decreases toward the distal end
wherein the main body portion has linear grooves extending in the axial direction provided in side walls of the main body portion at regular intervals, the linear grooves being indented to a depth from the outer surface of the main body portion into the hollow interior cavity of the main body portion, and
the depth of the linear grooves decreases continuously from the proximal end of the main body portion toward the distal end of the main body portion.
2. The shock-absorbing member according to claim 1, wherein the main body portion has a regular octagonal cross-section orthogonal to the axial direction.
3. The shock-absorbing member according to claim 1, wherein the entire shock-absorbing member is formed of metal.

* * * * *